March 30, 1926. 1,578,286
J. HARMATTA
PRODUCING PIPES BY ELECTRICALLY WELDING
Filed August 15, 1924
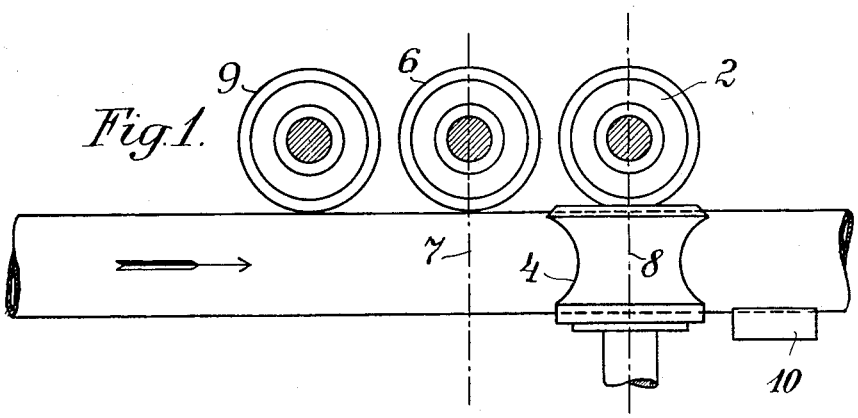
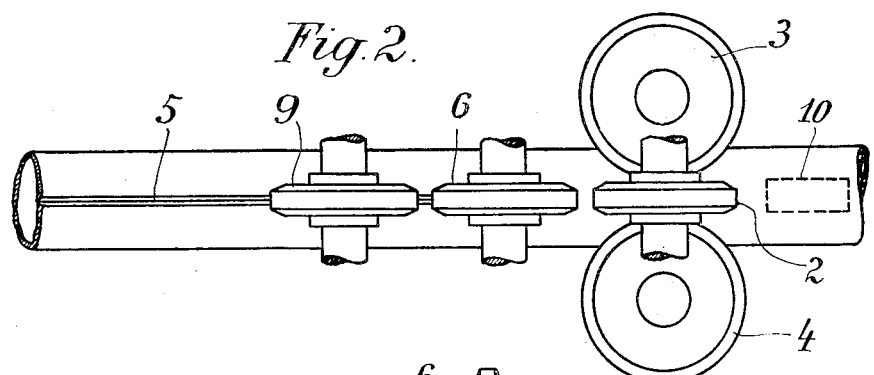
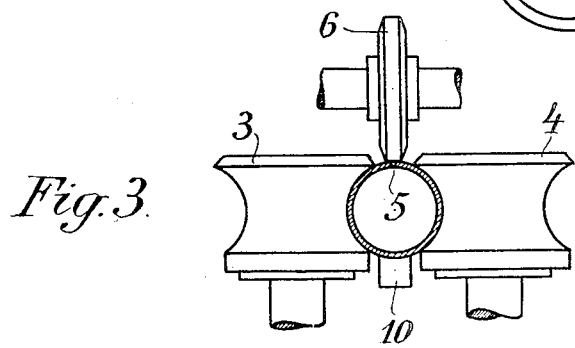
INVENTOR.
Johann Harmatta
BY: Francis E. Boyce
ATTORNEY Patented Mar. 30, 1926.

1,578,286

UNITED STATES PATENT OFFICE.

JOHANN HARMATTA, OF BUDAPEST, HUNGARY.

PRODUCING PIPES BY ELECTRICALLY WELDING.

Application filed August 15, 1924. Serial No. 732,188.

*To all whom it may concern:*

Be it known that I, JOHANN HARMATTA, a subject of the Kingdom of Hungary, residing at III Romai Furdo, Budapest, Hungary, have invented new and useful Improvements in Producing Pipes by Electrically Welding, of which the following is a specification.

This invention relates to a method and apparatus for continuously producing pipes by electrically welding together the edges of an iron ribbon rolled into a pipe the electric current being conducted along said edges.

I am aware of the fact that it is well known to electrically weld together iron ribbons along their edges and to conduct the current parallel with the welding-seam. In this known method of welding the current is transmitted from the rollers forming the electrodes to the workpiece in such a manner as to heat the whole of the cross-section of the same such heating being preferable when welding together iron ribbons. When, however, manufacturing pipes from iron ribbons rolled into a pipe it is essential that the whole of the width of the ribbon should remain cool as far as possible, and only the edges to be welded together should be heated to such an extent as to reach the welding-heat, for in this case only can the edges be pressed together with sufficient force and the pipe be advanced without causing deformation of the remaining portions of the same. It is evident therefore that the well known method of welding in which a great part of the cross section of the work-piece grows red-hot cannot be employed when welding pipes.

It is also known to manufacture pipes through electrical welding with the current conducted parallel to the welding-seam by means of a device one electrode-roller of which is provided on a rod projecting into the pipe to be manufactured said electrode-roller thus being located within the pipe. This method, however, is unfit for manufacturing pipes of small diameter, and is especially unfit for manufacturing pipes for gas- and water-supply having a diameter less than two inches, the clearance of the pipe being too small for the arrangement of an electrode-roller suitably cooled.

The present method of welding has for its object to remove the disadvantages above referred to. According to my invention this is accomplished by conducting the welding-current from one of the electrode-rollers to the other in such a manner as to enable the current to find its shortest way along the edges of the welding-seam the portions chiefly heated by the current thus being formed by said edges; and by providing each of the electrode-rollers on the outer surface of the pipe whereby the size of the electrode-rollers is no longer limited by the diameter of the pipe. According to my present invention the arrangement of the electrodes is such that one of the poles of the circuit is formed by a contact-roller provided outside the pipe over the welding-seam, and by two pressure-rollers provided on either side of the pipe and suitably shaped to fit the curve of the same such pressure-rollers pressing together the edges of the pipe to be welded; the other pole of the circuit being formed by a roller arranged over said welding-edges and touching both of these edges in a width broad enough for securing transmission of the electric current. Thus the current is being transmitted directly to the edges of the welding-seam, and further it has to take its way from said edges to the first mentioned contact roller, and to the two pressure-rollers in such a manner as to heat most intensively the edges of the welding-seam.

In the accompanying drawing one form of an apparatus for carrying the improved method into effect is shown by way of example.

Fig. 1 is a diagrammatical side view;

Fig. 2 is a diagrammatical top view, and

Fig. 3 is a cross-sectional view of the improved pipe welding machine.

In the pipe welding machine according to Figs. 1, 2 and 3 there are provided two pressure-rollers 3 and 4 spanning round most of the circumference of the pipe and being capable of exerting a powerful pressure on the same so as to suitably press together the slot 5 of the pipe. Over the welding-seam there is also provided a contact-roller 2, and between the two pressure rollers 3 and 4 there is provided a sliding-contact 10, each of the three contact-rollers 2, 3 and 4 as well as the sliding-contact 10 being connected to one of the poles of the circuit, the other pole of which is connected to the contact-roller 6 arranged over the slot 5 of the pipe. The pipe is advanced continuously in the direction of the arrow shown in Fig. 1, that is from the roller 6 towards the rollers 2, 3 and 4 whereby the current is transmitted from the contact point 7 of the roller 6 up to the contact lines of the rollers 2, 3 and 4 in Fig. 1 marked with the line 8. It may be understood that the current is transmitted directly along the edges of the welding-seam thus heating said edges only whereby the other portions of the pipe remain comparatively cool and as a consequence stiff.

Experiments have shown that the greatest heat in the welding-seam is generated in the middle between the two contact places 7 and 8 so that the pressure-rollers 3 and 4 are enabled to effect a reliable welding together of the edges of the welding-seam.

By adjustably arranging either the roller 6 or the rollers 2, 3 and 4 or both of these roller groups the spot having the welding-heat can be made adjustable and can be shifted as may be desired.

In order to ensure safe contact between the contact-rollers and the pipe when some insulating dirt is getting between the roller 6 and the pipe a second contact-roller 9 connected to the same pole of the circuit as the roller 6 may be provided in front of the latter.

When the pressure-rollers 3 and 4 ensure a suitable transmission of the current the sliding-contact 10 and even the contact-roller 2 may be omitted so that one electrode of the circuit is formed by the pressure-rollers 3 and 4 only.

Claims:

1. The hereindescribed method of manufacturing electrically welded pipes in continuous operation, which consists in conducting the current from an electrode-roller provided outside the pipe and touching the two edges to be welded together to two electrode-rollers provided one on either side of the pipe to be manufactured, said two rollers being displaced in the longitudinal direction of the pipe with respect to the first mentioned electrode-roller and pressing together said two edges of the welding seam.

2. In an apparatus for manufacturing electrically welded pipes in continuous operation, the combination with a roller disposed outside the pipe in contact with the two edges to be welded together and forming one electrode of the welding current circuit, of two rollers disposed one on either side of the pipe to be manufactured, said two rollers being displaced in the longitudinal direction of the pipe with respect to the first mentioned electrode-roller and adapted to press together said two edges of the welding seam, said two rollers forming the other electrode of the welding current circuit.

3. In an apparatus for manufacturing electrically welded pipes in continuous operation, the combination with a roller disposed outside the pipe in contact with the two edges to be welded together and forming one electrode of the welding current circuit, of two rollers disposed one on either side of the pipe to be manufactured, said two rollers being displaced in the longitudinal direction of the pipe with respect to the first mentioned electrode-roller and adapted to press together said two edges of the welding seam, and a roller disposed over the welding seam electrically connected to said two pressure rollers and forming with the latter the other electrode of the welding current circuit.

4. In an apparatus for manufacturing electrically welded pipes in continuous operation, the combination with a roller disposed outside the pipe in contact with the two edges to be welded together and forming one electrode of the welding current circuit, of two rollers disposed one on either side of the pipe to be manufactured, said two rollers being displaced in the longitudinal direction of the pipe with respect to the first mentioned electrode-roller and adapted to press together said two edges of the welding seam, said two rollers forming the other electrode of the welding current circuit, the distance between the two electrodes effecting transmission of the welding current being adjustable for displacing the spot of the welding seam having the welding heat.

5. In an apparatus for manufacturing electrically welded pipes in continuous operation, the combination with a roller disposed outside the pipe in contact with the two edges to be welded together and forming one electrode of the welding current circuit, of two rollers disposed one on either side of the pipe to be manufactured, said two rollers being displaced in the longitudinal direction of the pipe with respect to the first mentioned electrode-roller and adapted to press together said two edges of the welding seam, and a roller provided over the welding seam electrically connected to said two pressure rollers and forming with the latter the other electrode of the welding current circuit, the distance between the two electrodes effecting transmission of the welding current being adjustable for the purpose of displacing the spot of the welding seam having the welding heat.

In testimony whereof I have signed my name to this specification.

JOHANN HARMATTA.